US008705963B2

United States Patent
Patel et al.

(10) Patent No.: US 8,705,963 B2
(45) Date of Patent: Apr. 22, 2014

(54) K-ALTERNATE CHANNEL SELECTION FOR THE ROUTING, WAVELENGTH ASSIGNMENT AND SPECTRUM ALLOCATION IN FLEXIBLE OPTICAL WDM NETWORKS

(75) Inventors: Ankitkumar Patel, E. Brunswick, NJ (US); Philip Nan Ji, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 180 days.

(21) Appl. No.: 13/236,460

(22) Filed: Sep. 19, 2011

(65) Prior Publication Data

US 2012/0070148 A1 Mar. 22, 2012

Related U.S. Application Data

(60) Provisional application No. 61/384,129, filed on Sep. 17, 2010.

(51) Int. Cl.
*H04J 14/00* (2006.01)

(52) U.S. Cl.
USPC .................................. 398/58; 398/45

(58) Field of Classification Search
USPC .................................. 398/45, 57, 58
See application file for complete search history.

(56) References Cited

U.S. PATENT DOCUMENTS

| 7,088,922 | B2 * | 8/2006 | Tomofuji et al. | 398/95 |
| 2010/0158528 | A1 * | 6/2010 | Resende et al. | 398/79 |

* cited by examiner

*Primary Examiner* — Dalzid Singh
(74) *Attorney, Agent, or Firm* — Joseph Kolodka

(57) ABSTRACT

A method implemented in an optical flexible wavelength division multiplexing FWDM network includes finding a first channel out of available channels with sufficient spectrum on a given route out of available channels in an optical FWDM network; finding a second channel at a lower wavelength out of the available channels for minimizing total spectrum on the given route; selecting a channel out of the available channels on K-distinct shortest routes; and finding line rates of channels using a predetermined channel selection.

2 Claims, 4 Drawing Sheets

US 8,705,963 B2

K-ALTERNATE CHANNEL SELECTION FOR THE ROUTING, WAVELENGTH ASSIGNMENT AND SPECTRUM ALLOCATION IN FLEXIBLE OPTICAL WDM NETWORKS

This application claims the benefit of the following U.S. Provisional Application No. 61/384,129, entitled, "K-Alternate Channel Selection for the routing, Wavelength Assignment and Spectrum Allocation in the Flexible Optical WDM Networks", filed Sep. 17, 2010, is related to co-pending U.S. patent application Ser. No. 13/234,979, entitled, "RATE SELECTION PROCEDURE FOR CHANNEL SELECTION IN FLEXIBLE WDM NETWORKS", filed Sep. 16, 2011, and co-pending U.S. patent application Ser. No. 13/236,535, entitled, "Greedy Channel Selection Procedure for the Routing, Wavelength Assignment, and Spectrum Allocation in the Flexible Optical WDM Network", filed Sep. 17, 2011, all of which whose contents are incorporated herein by reference.

BACKGROUND OF THE INVENTION

The present invention relates generally to optical communications and more particularly to K-alternate channel selection for the routing, wavelength assignment and spectrum allocation in flexible optical WDM networks.

The channel spacing in the current optical WDM networks is fixed and same for all channels, standardized by the ITU-T [ITU-T], irrespective of the line rate of channels (FIG. 1(a)). We refer to such networks as the fixed grid networks. Fixed spectrum assigned to channels in the fixed grid networks may not be sufficient if the channels require larger spectral width to support higher line rates. On the other hand, if channels are operating at low line rates, then the required spectrum may be smaller than the assigned spectrum. Thus, in a mixed line rate system, the spectrum efficiency is not optimized for each line rate in the fixed grid networks.

There has been growing research interests on optical WDM systems that are not limited to fixed ITU-T channel grid, but offer flexible channel grid to increase the spectral efficiency. We refer to such networks as the Flexible optical WDM networks (FWDM) (FIG. 1(b)).

Some important problems in the FWDM networks are: for a given configuration of the optical network in terms of location of optical nodes and the deployed fibers connecting optical nodes, and a given set of connections with finite data rates between two disjoint optical nodes; i) how to find a set of all-optical channels (channels that are distinguished based on its operating wavelength and spectrum allocation) which can support the requested data rate for each connection; ii) how to select the line rate of channels for each connection to support the required data rates; and iii) how to route these channel in the network, such that the total required spectrum for the optical WDM network is minimized. Channels which transfer data between end users, without converting them into electrical domain, are referred to as the All-Optical channels. Together the problems described above are referred to as the Routing, Wavelength assignment, and Spectrum Allocation (RWSA herein) in the all-optical flexible optical WDM networks.

Since in the fixed grid networks, the spectrum, assigned to each channel, are fixed and remain the same for all channels, the channels can only be distinguished based on their operating wavelength. Thus, the RWSA problem is transformed into the Routing, and Wavelength Assignment problem (RWA). The RWA is the special case of the RWSA problem in which the spectral width of all channels is the same. When finding a connection in all-optical fixed grid WDM networks using the RWA solutions, we need to make sure that the same wavelength is available on all fiber cables along the route, which we refer as the wavelength continuity constraint. On the other hand, when finding a connection in the FWDM networks, the RWSA solutions need to satisfy not only the wavelength continuity constraint, but also make sure that the same continuous spectrum is available on each fiber in the link, which we refer as the spectral continuity constraint. Additionally, the spectrum allocation to different channels must be non-overlapping, which we refer as spectral conflict constraint. Thus, due to spectral continuity and spectral conflict constraints, existing solutions for the RWA problem may not be applicable to the RWSA problem.

We have proposed a mathematical formulation of the problem in terms of Integer Linear Program (ILP). However, the time required to solve the RWSA problem using the ILP is very long, and increases exponentially with the system size. Thus, the contemplated solution is not scalable.

Accordingly, there is a need for an efficient channel selection in a flexible WDM (FWDM) network.

BRIEF SUMMARY OF THE INVENTION

The present invention is directed to an efficient procedure to solve the RWSA problem, namely K-alternate channel selection procedure, which reduces the time required to solve the RWSA problem significantly with only marginal degradation in solution quality.

In an aspect of the invention, a method implemented in an optical flexible wavelength division multiplexing FWDM network includes finding a first channel out of available channels with sufficient spectrum on a given route out of available channels in an optical FWDM network; finding a second channel at a lower wavelength out of the available channels for minimizing total spectrum on the given route; selecting a channel out of the available channels on K-distinct shortest routes; and finding line rates of channels using a predetermined channel selection.

In more specific aspect of the invention a method implemented in a communications system, including an optical flexible wavelength division multiplexing FWDM network, includes finding an optimal set of line rates for a requested data rate of each connection in the FWDM using a channel selection for a total spectrum requirement for the set of line rates that is minimal; determining available channels with sufficient spectrum for each connection in a given set of each connection in a specific order; ascertaining K-distinct shortest routes for each connection; acquiring spectrum availability information for each K-distinct routes using spectrum availability information of all links along a respective route of K-distinct routes; and selecting, among the K-distinct routes, a route having an available channel at a lowest wavelength so that all the connections are confined to lowest available wavelengths, thereby minimizing amount of spectrum needed for communication in the FWDM network.

We first introduce some terminologies in order to explain the K-alternate channel selection procedure. In this method, we assume that the given spectrum is discretized in the frequency domain in order to reduce the complexity of the RWSA problem. The smallest unit of a spectrum is referred to as wavelength slot. We also assume that the required spectrum by any line rate is larger than the spectrum of a wavelength slot. The spectrum can also be referred to in terms of the number of wavelength slots. In a fiber section, a wavelength slot can be in the available state or the occupied state. No more than one channel can occupy a wavelength slot (spectrum), however an optical channel can occupy more than one consecutive wavelength slots. The state information of wavelength slots on a fiber cable or a route is referred to as the spectrum availability information. The lower end of the consecutive wavelength slots is referred to as the wavelength of a channel.

These and other advantages of the invention will be apparent to those of ordinary skill in the art by reference to the following detailed description and the accompanying drawings.

DETAILED DESCRIPTION

Figure 1:
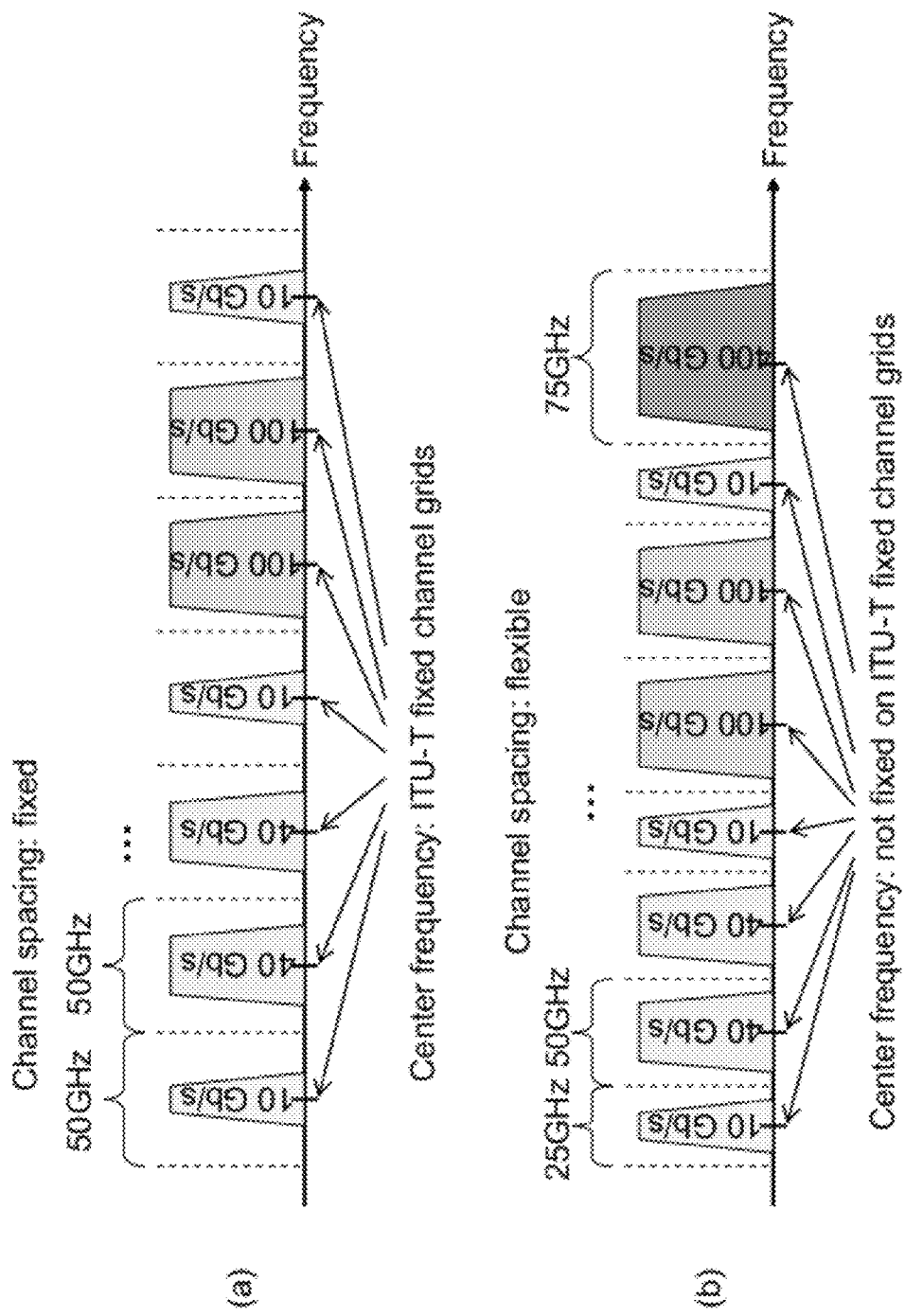
FIG. 1 depicts fixed transmission channel spacing and flexible transmission channel spacing to which the inventive method is directed.

The present invention is directed to an efficient procedure to solve the RWSA problem, namely K-alternate channel selection procedure, which reduces the time required to solve the RWSA problem significantly with only marginal degradation in solution quality. With the inventive technique the required time to solve the RWSA problem increases polynomially using the inventive K-alternate channel selection procedure, rather than exponentially with the system size. The inventive efficient K-alternative channel selection procedure that can perform routing, wavelength assignment and spectrum allocation for any given network setting with optimum spectrum allocation while not requiring time consuming exhaustive search.

We first introduce some terminologies in order to explain the K-alternate channel selection procedure. In this method, we assume that the given spectrum is discretized in the frequency domain in order to reduce the complexity of the RWSA problem. The smallest unit of a spectrum is referred to as wavelength slot. We also assume that the required spectrum by any line rate is larger than the spectrum of a wavelength slot. The spectrum can also be referred to in terms of the number of wavelength slots. In a fiber section, a wavelength slot can be in the available state or the occupied state. No more than one channel can occupy a wavelength slot (spectrum), however an optical channel can occupy more than one consecutive wavelength slots. The state information of wavelength slots on a fiber cable or a route is referred to as the spectrum availability information. The lower end of the consecutive wavelength slots is referred to as the wavelength of a channel.

In the proposed method, first we find the optimal set of line rates for the requested data rate of each connection using the channel selection procedure [IR1]. Through this procedure, the total spectrum required for the set of line rates is minimum. Then we find available channels with sufficient spectrum one by one for each connection in the given set of connections in a specific order. For each connection, we find the K-distinct shortest routes. Here we determine the value of K based on alternative routes estimation procedure. We generate the spectrum availability information for each route using the spectrum availability information of each link along the respective route. A channel operating at first available wavelength is searched on each route with sufficient spectrum, required for a requested line rate, using the spectrum availability information. Among K-distinct shortest routes, a route is selected which has the available channel at the lowest wavelength. Since this method gives higher priority to the channels which are operating at lower wavelengths, all connections are confined to the lowest available wavelengths, and thus minimizes the amount of spectrum needed. The K-distinct shortest routes provide some flexibility to optimize the total spectrum while restricting the excessive use of the spectrum by selecting longer routes.

We denote K as the number of routes to be considered for each connection, $\Delta$ as the given set of connections, $\Delta'$ as the set of connections obtained through channel selection procedure, $R^{sd}_\gamma$ as a connection with data rate $\gamma$ between end user s and d, $Y^{sd}$ as the physical shortest distance of a route connecting end user s with the end user d, L as a set of line rates supported by the network, l as the line rate of a channel, $x_l$ as the required spectrum for a channel operating at line rate l, $Z_e^w$ as the state of a wavelength slot w on fiber e (if the wavelength slots, w, is available on fiber e, then $Z_e^w$ is equal to 1, otherwise 0), $Z_e^w$ is also referred as the spectrum availability information of a fiber e, $P_i^w$ as the state of a wavelength slot, w, on route i (If the wavelength slot, w, is available on all fibers along the route, then $P_i^w$ is equal to 1, otherwise 0), $P_i^w$ is also referred as the spectrum availability information of a path i, $L^\gamma$ as the optimal set of line rates obtained through channel selection procedure on data rate $\gamma$, and $E_i$ as a set of fibers e along path i. The spectrum of a wavelength slot is denoted as, $\delta$. The total number of such wavelength slots, W, can be given by the following formula:

$$W = \max_{l \in L}[x_l/\delta]|\Delta'| \qquad (1)$$

Figure 2A:
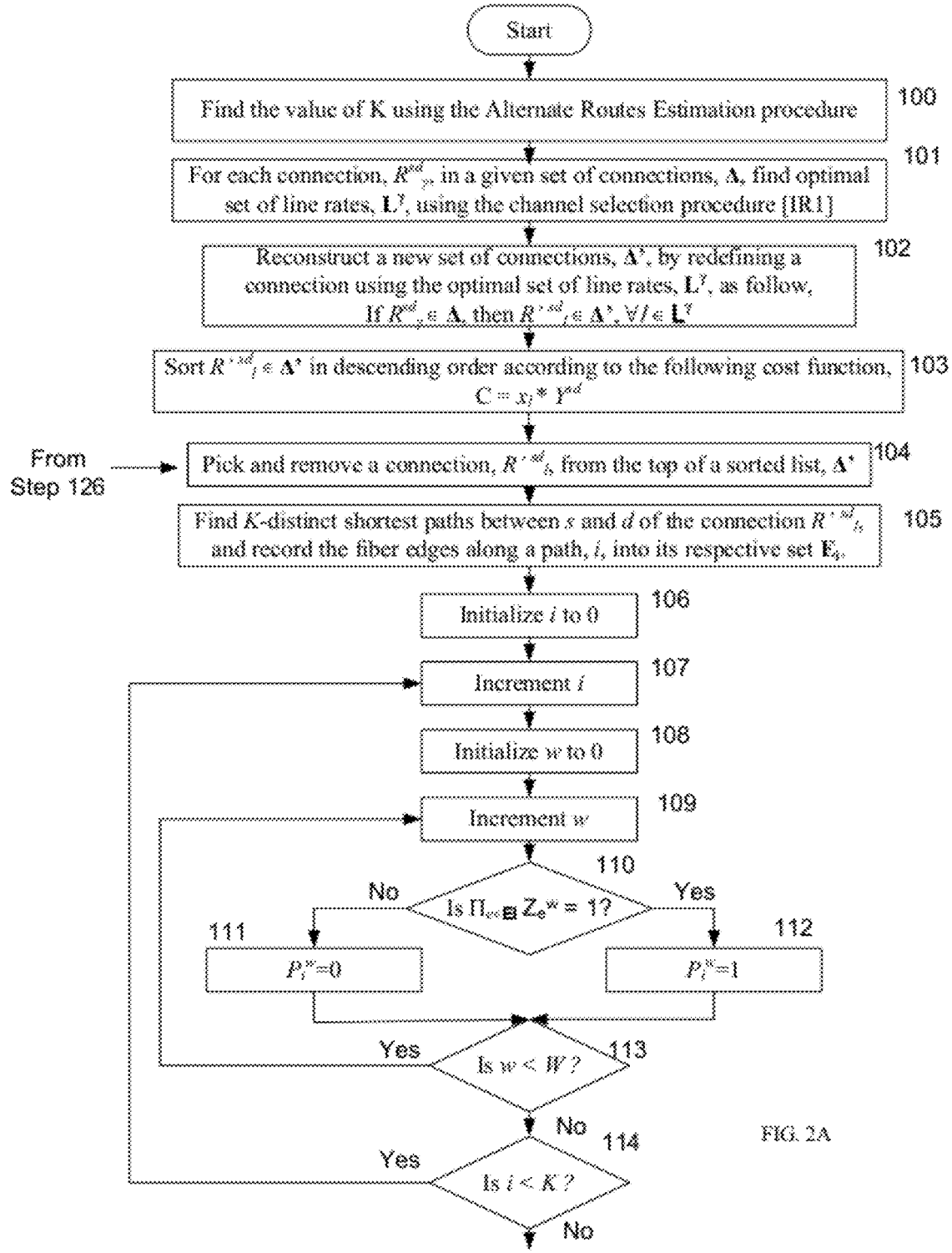
FIGS. 2A and 2B together are a flow diagram of the K-alternate channel selection for routing, wavelength assignment, and spectrum allocation (RWSA), in accordance with the invention.
Figure 2B:
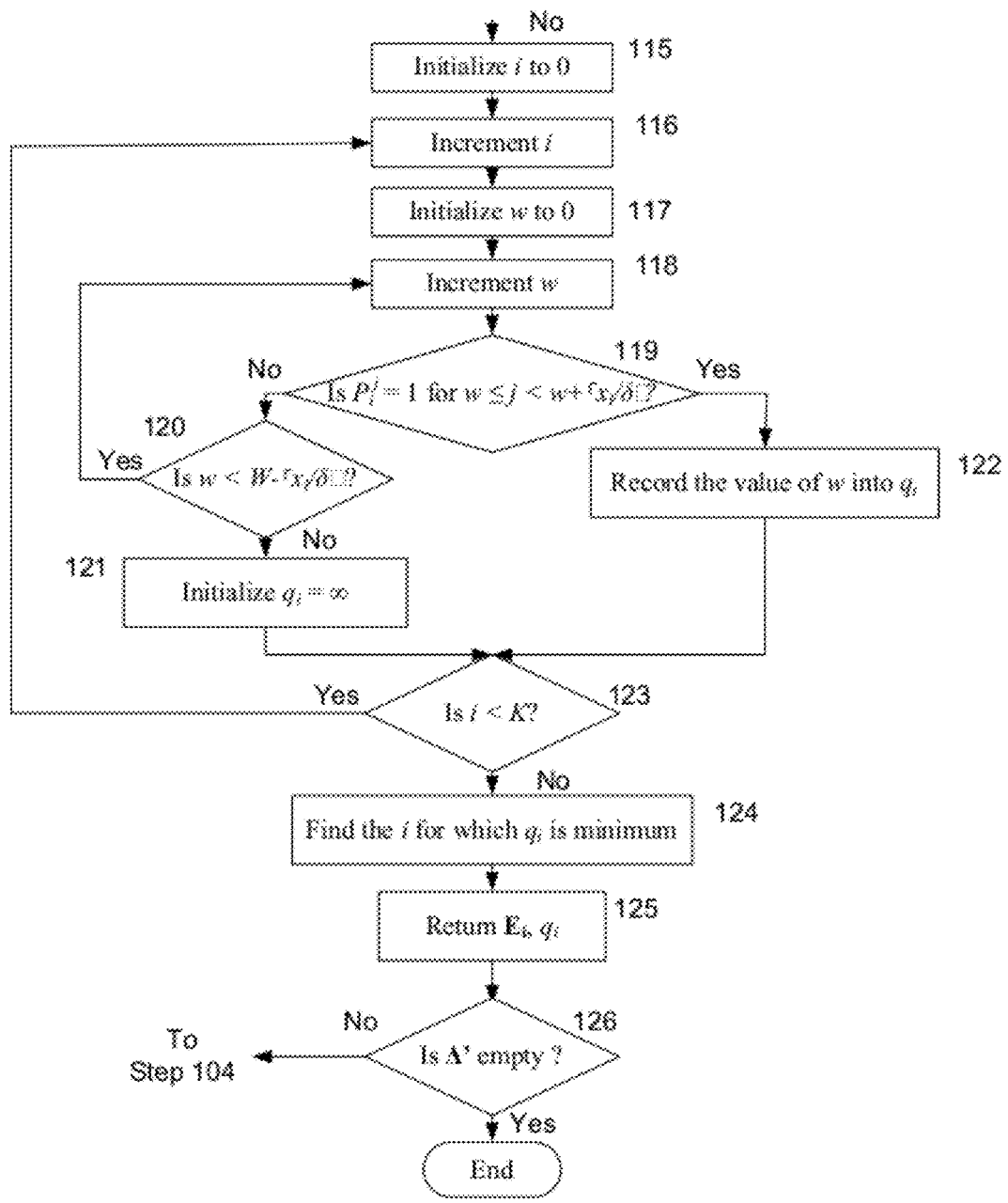

The flowchart for the inventive method for the RWSA problem in FWDM networks is shown in FIGS. 2A and 2B, and a discussion thereto follows below.

Figure 3:
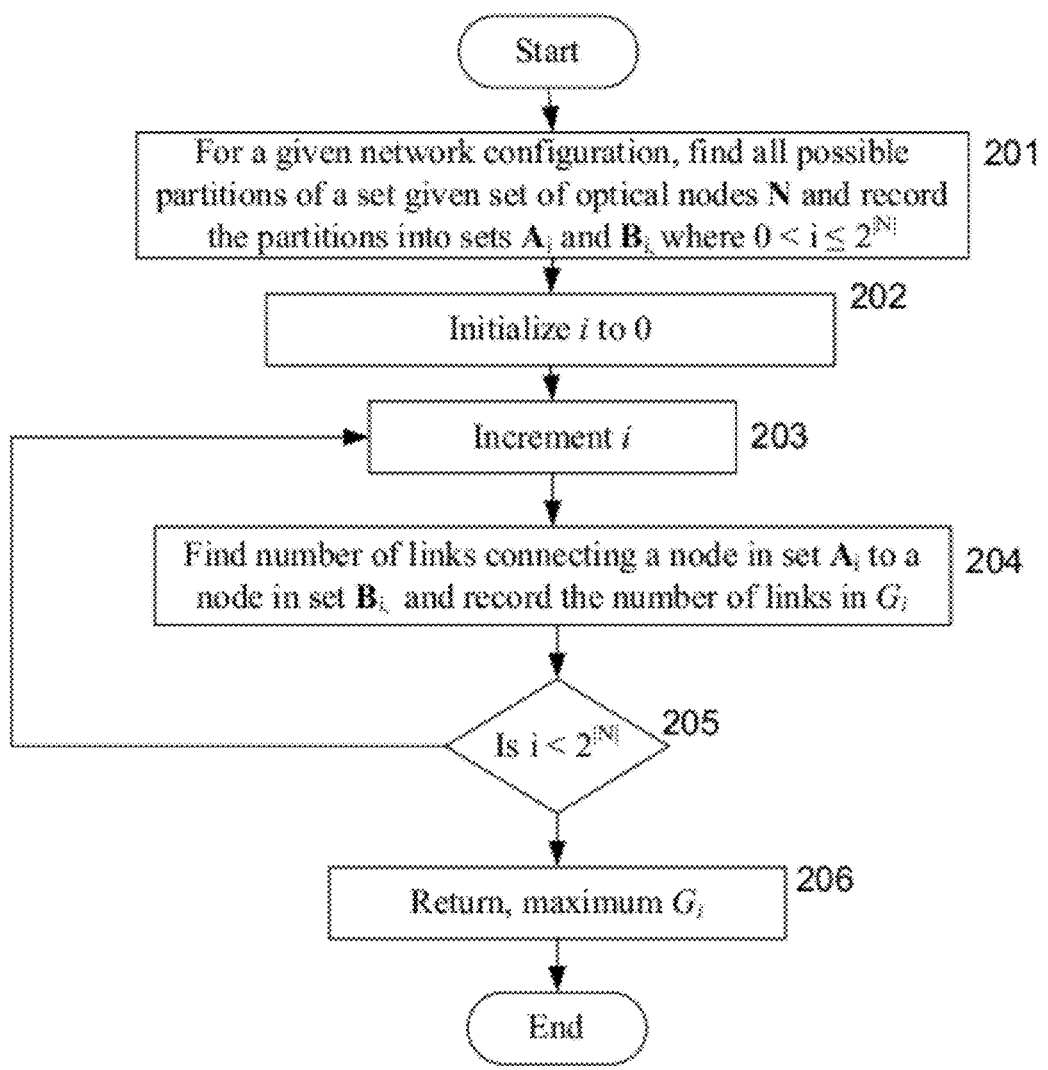
FIG. 3 is a flow diagram for the alternate routes estimate, in accordance with the invention

Initially, the value of K using the Alternate Route Estimation procedure shown in FIG. 3 is undertaken 100. The invention then uses a channel selection procedure to find the optimal set of line rates, $L^\gamma$, for the requested data rate $\gamma$ by the connection The The total spectrum of the set of line rates, $L^\gamma$, is minimum 101. The method then 102 redefines a connection based on a line rate instead of the requested data rate. For each given connection, defined based on data rate, $R^{sd}_\gamma$, we create a new connection $R^{sd}_l$, where $l \in L^\gamma$. This procedure results in a new set of requests, $\Delta'$.

After redefining the connection 102, the method then sets out to sort the connections of a set, $\Delta'$, in descending order of a cost function, C, which is the multiplication of the required spectrum by a connection and the shortest distance of a connection, $(x_l * Y^{sd})$ 103. This cost function is proportional to the spectrum requirement of the connection, and the shortest physical distance of the route connecting end users of the connection. The reason behind this strategy is that the probability of availability of channel at lower wavelengths decreases as the required spectrum increases. Similarly, the probability of availability of channels at lower wavelength decreases as the length of the connection increases. Thus, by giving a higher priority to those connections, which require large amount of spectrum, and with large physical distance between the end users, we increase the probability of successfully establishing them at lower wavelengths.

Following the sorting 103, the method selects and removes a connection from the sorted list, $\Delta'$ 104, and then 105 finds K-distinct shortest routes for the selected connection, and records each route i, in the respective set $E_i$. Instead of finding a single route, finding k routes gives us more flexibility in selecting channels. Additionally, restriction on selecting a channel from the K shortest paths limits the number of fibers through which the connection is routed, and thus avoids over-utilization of spectrum.

After the K-distinct shortest routes are found, the method then 106 initializes the index of the route to zero, 107 increments the index of the route, 108 initializes the index of a wavelength slot to zero, 109 increments the index of a wavelength slot and 110: This step checks the availability of a current wavelength slot on each links along the path. If the wavelength slot is available, the method follows step 112, otherwise, the method proceeds to step 111. If the wavelength slot is not available on at least one of the fibers on the route, then update the state of the wavelength slot of the route, $P_i^w$, to zero 111. If the wavelength slot is available on all fibers along the route, then 112 update the state of the wavelength slot of the route, $P_i^w$, to 1.

In the next step 113, if the wavelength slot is less than the total number of wavelength slots, W, we the method repeats steps 109, 110, 111, and 112, otherwise step 114 is undertaken.

The sequence of actions, under steps 106 to 114, find the spectrum availability information for each of the K-distinct routes using the spectrum availability information of all links along the respective route. If the index of a path is less than the K paths 14, then steps from 107 to 113 are repeated. The index of the route to zero is reinitialized 115. The index of the route is incremented 116. The index of wavelength slot to zero is reinitialized. The index of wavelength slot is incremented 118.

Then the method 119 checks the availability of a wavelength slots starting from the current wavelength slot, w, up to the number of wavelength slots, $w+\lceil x_i/\delta \rceil$, which is an equivalent number of wavelength slots for the required spectrum by the requested line rate, on path i. If all the wavelength slots are available from w up to $w+\lceil x_i/\delta \rceil$, then step 122 is followed, otherwise step 120 is processed. If the condition in step 119 is not satisfied, the index of the wavelength slot, w is checked 120. If the index of the wavelength slot is less than $W-\lceil x_i/\delta \rceil$ then steps 118 and 119 are repeated, otherwise step 121 is undertaken.

121. If the method has finished checking for the availability of number of wavelength slots, equivalent to the required spectrum of the line rate, starting from each wavelength slots up to wavelength slot, $W-\lceil x_i/\delta \rceil$, and so far if the method has not found any wavelength slot starting from which $w+\lceil x_i/\delta \rceil$ wavelength slots are available, then the wavelength at which the requested channel is available on path i, $q_i$ is recorded as ∞. Next 122, if there exists some wavelength slot, w, starting from which $w+\lceil x_i/\delta \rceil$ wavelength slots are available, then the wavelength at which the requested channel is available on path i, $q_i$ is recorded as w.

Then at step 123, if the index of the route is less than K, then steps starting form 116 up to 122 are repeated. Here, steps 115-123 find the first available channel on each of the K-distinct routes by searching the consecutive wavelength slots equivalent to the spectrum required by the line rate of a connection on the spectrum availability information of the respective route.

In this step 124, the method finda a route, i, for which $q_i$ is minimum. Since $q_i$ represents the first available channel starting from lower wavelengths on route i, in this step the method finds a channel which operates at lower wavelength among K-distinct shortest routes. Next 125, the method returns the route and the wavelength starting from which the channel is available with sufficient spectrum. If the solution for all the connection is found 126, we terminate the procedure, otherwise we repeat the steps starting from 104 up to 125.

In the inventive method for the RWSA problem, steps 106 to 114 find the availability of wavelength slots along each path, and Steps 115 to 123 find the availability of channels for a give connection on each path.

Referring now to FIG. 3, there is shown a flowchart for the method to estimate the number of distinct shortest routes in the K-Alternate channel selection procedure, which has been referred to as the Alternate Route Estimation procedure.

The Alternate Routes Estimation procedure estimates the number of distinct shortest routes needed for the K-alternative channel selection method. If an optical node is connected to another optical node through some fiber cables, such a physical connection between optical nodes is referred to as a link. The inventive method partition a a given set of optical nodes into two sets, and count the number of links connecting an optical node in one set to an optical node in other set. The method follows this procedure for all possible partitions of a given set of optical nodes. For example, if N is a set of nodes, then the method repeats the procedure $2^{[N]}$ times which is the total number of possible partitions. After finding the number of links for each partition, the invention finds the maximum number of links which represents the estimation of K.

The invention 201 then find all possible partitions of a given set of nodes N, and record the $i^{th}$ partition into sets $A_i$ and $B_i$. The 202 method initializes the index of the partition to 0. The index of the partition is incremented 203. The number of links for the $i^{th}$ partition is found, and the value in $G_i$ is recorded 204. The invention then checks whether there is any partition left for which we have not yet counted the total number of links 205. If yes, steps 203 and 204 are repeated, otherwise the method proceeds to step 206. In the final step 206, the invention finds the maximum number of links among all partitions and return that value as the estimation of number of K-distinct shortest paths.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. The invention can be implemented with a computer system configuration including processing, input/output, and storage capabilities interacting with the communication system. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method in a communications system including an optical flexible wavelength division multiplexing FWDM network, comprising:
   i) finding an optimal set of line rates for a requested data rate of each connection in said FWDM using a channel selection for a total spectrum requirement for said set of line rates that is minimal;
   ii) determining available channels with sufficient spectrum for each said connection in a given set of said each connection in a specific order;
   iii) ascertaining K-distinct shortest routes for each said connection;

iv) acquiring spectrum availability information for each said K-distinct routes using said spectrum availability information of all links along a respective route of said K-distinct routes; and v) selecting, among said K-distinct routes, a route having an available channel at a lowest wavelength so that all said connections are confined to lowest available wavelengths, thereby minimizing amount of spectrum needed for communication in said FWDM network, steps i)-v) being carried out by a computer.

2. A computer implemented method implemented in an optical flexible wavelength division multiplexing FWDM network, comprising:

i) finding a first channel out of available channels with sufficient spectrum on a given route out of available channels in an optical FWDM network;

ii) finding a second channel at a lower wavelength out of said available channels for minimizing total spectrum on said given route; and iii) selecting a channel out of said available channels on K-distinct shortest routes; and finding line rates of channels using a predetermined channel selection;

steps i)-iii) being implemented by a computer.

* * * * *